United States Patent [19]

Kreutzer et al.

[11] Patent Number: 4,842,628
[45] Date of Patent: Jun. 27, 1989

[54] METHOD OF VERIFYING A POROUS ARTICLE MADE OUT OF GLASS SOOT AND FURNACE FOR CARRYING OUT THE METHOD

[75] Inventors: Karl Kreutzer; Fritz Simmat, both of Gelnhausen; Anton Steinkohl, Grundau; Wolfgang Englisch, Kelkheim, all of Fed. Rep. of Germany

[73] Assignee: Heraeus Quarzschmelze GmbH, Quarzstrabe, Fed. Rep. of Germany

[21] Appl. No.: 162,823

[22] Filed: Mar. 2, 1988

[30] Foreign Application Priority Data

Apr. 3, 1987 [DE] Fed. Rep. of Germany ....... 3711281

[51] Int. Cl.$^4$ .......................... C03B 20/00; C03B 23/04
[52] U.S. Cl. ........................................ 65/3.12; 65/32.1; 65/33; 65/269; 65/285
[58] Field of Search ...................... 65/1, 3.12, 32.1, 33, 65/269, 285

[56] References Cited

U.S. PATENT DOCUMENTS 4,072,489  2/1978  Loxley et al. ...................... 65/32 X
4,715,875 12/1987  Jacobson ............................ 65/3.12

FOREIGN PATENT DOCUMENTS 2827303 1/1979 Fed. Rep. of Germany.
1596088 8/1981 United Kingdom.

Primary Examiner—Arthur Kellogg
Attorney, Agent, or Firm—Sprung Horn Kramer & Woods

[57] ABSTRACT

A method of vitrifying a porous cylindrical article made out of glass soot, especially for manufacturing a preliminary blank for optical fibers. The article is heat-treated in a furnace in a vacuum or in an atmosphere that contains helium. The porous article is placed in a horizontal graphite tube in the furnace, is sintered therein for 20 to 40 minutes in a vacuum or in a helium atmosphere with reduced pressure at 1250° to 1400° C., and is subsequently vitrified by heat-treating the sintered article at first in the sintering atmosphere, while slowly rotating it in the hot graphite tube for 20 to 40 minutes at approximately 1450° to 1600° C. and then while rotating it in the graphite tube more rapidly than in the first stage for 10 to 30 minutes at approximately 1650° to 1750° C.

12 Claims, 1 Drawing Sheet

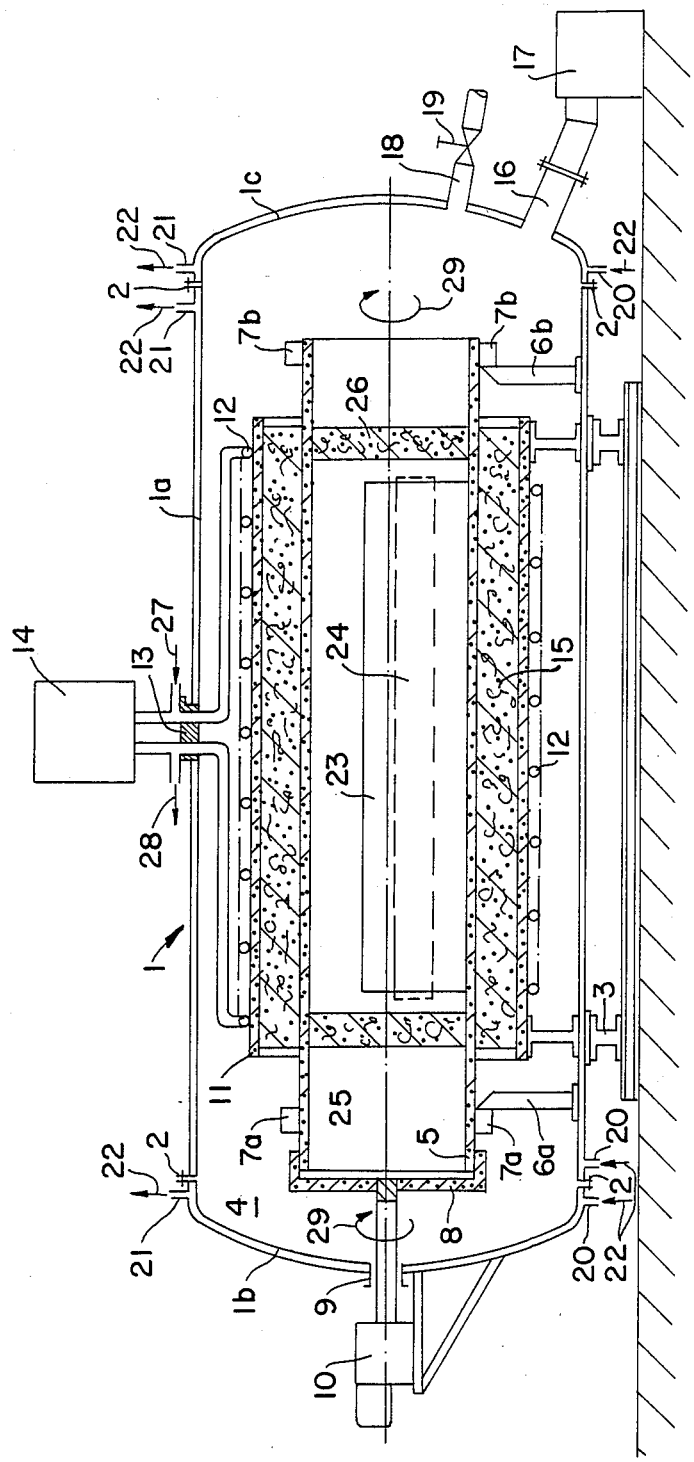

METHOD OF VERIFYING A POROUS ARTICLE MADE OUT OF GLASS SOOT AND FURNACE FOR CARRYING OUT THE METHOD

BACKGROUND OF THE INVENTION

1. Field of the Invention

The invention concerns a method of vitrifying a porous cylindrical article made out of glass soot, especially for manufacturing a preliminary blank for optical fibers and a furnace for carrying out the method. In this method the article is heat-treated in a furnace in a vacuum or in an atmosphere that contains helium. Glass soot consists of fine vitreous particles of essentially silicon dioxide that are derived from the gas phase, manufactured, for example, by flame hydrolysis from silicon tetrachloride, and are precipitated onto a carrier, whereby an additive, germanium dioxide for instance, that alters the index of refraction of the precipitate can optionally be included during the precipitation.

2. Background Information

Methods of the aforesaid type are known, from German Pat. No. 2,827,303 for example. The porous glass-soot article in the form of a hollow cylinder is compacted by suspending it vertically from a tubular support and inserting it at a prescribed rate into a heated section of a furnace from above, so that the article, commencing at its free end and terminating at its suspended end, becomes progressively compact. The heat treatment can be carried out in various known inert-gas atmospheres, for example, helium, nitrogen, argon, or mixtures thereof. The channel that extends axially through the article can be connected to a vacuum pump.

In the known method, the original cross-section of the article that is to be compacted into a dense piece of glass is retained, with a particular section of the article being non-circular, elliptical, for example, and that shape is maintained during the heat treatment. The same is true when the cross-section is circular and increases or decreases along the axis.

SUMMARY OF THE INVENTION

An object of the invention is to provide a method of vitrifying porous articles made out of glass soot wherein, independent of the outer contour of the article before vitrification, the cross-section of the heat-treated article will be practically a constant circle.

This object and other objects, aims, and advantages are attained in accordance with the invention in a method of the aforesaid type in that the porous article is placed in a horizontal graphite tube in the furnace, is sintered therein for 20 to 40 minutes in a vacuum or in a helium atmosphere with reduced pressure at 1250° to 1400° C., and is subsequently vitrified by heat-treating the sintered article at first in a sintering atmosphere, while slowly rotating the article in the hot graphite tube for 20 to 40 minutes at approximately 1450° to 1600° C. and then while rotating the article in the graphite tube more rapidly than in the first stage for 10 to 30 minutes at approximately 1650° to 1750° C.

It is preferred to rotate the article during the first stage by turning the graphite tube at approximately 1 to 5 revolutions per minute and in the second stage by turning the graphite tube at approximately 20 to 40 revolutions per minute. The heat treatment that proceeds the two vitrification stages in accordance with the invention is essentially intended to solidify the initially porous article to the extent that it can be vitrified in two stages in accordance with the invention. Since the overall article will be at the aforesaid temperatures, there will be no longitudinal stresses to crack the cylindrical article. Rotating the article during the two vitrification stages in conjunction with its horizontal orientation throughout the whole heat treatment, will prevent the quartz glass or doped quartz glass from flowing subject to gravity, whereas irregularities in the outer contour of the article will on the other hand be compensated by the rotation, so that the method in accordance with the invention can be employed to manufacture vitrified articles with practically the same regular circular cross-section over their total length, which is a particular advantage when the vitrified article is to be employed as a blank for optical fibers.

It is preferred to maintain in the furnace during the sintering process a vacuum of $10^{-1}$ to 10 mbars or a helium atmosphere with a pressure of 50 to 200 mbars.

During or subsequent to the second stage of vitrification it is preferred to flood the inside of the furnace with an inert gas such as nitrogen, argon, or helium or with a mixture of at least two of these gases and to generate a pressure less than normal, preferably in the range of 5 to 100 bars. This will eliminate or decrease the number of any bubbles still present in the hot article.

If the article that is to vitrified is a hollow cylinder, it is preferred to position a solid or hollow cylindrical graphite tube slightly loose inside it. This measure will ensure a very uniform heating of the article being treated in accordance with the invention.

Once the vitrified article has been allowed to cool in the furnace, it is removed therefrom and supplied for subsequent processing.

BRIEF DESCRIPTION OF THE DRAWING

The FIGURE is a schematic illustration of one preferred embodiment of a furnace for carrying out the method in accordance with the invention.

DETAILED DESCRIPTION OF THE INVENTION

Referring to the FIGURE, the furnace has a chamber 1 that consists of a cylindrical midsection 1a that is secured to two end sections 1b and 1c by flanges 2. The furnace rests on the ground on a base 3. The inside 4 of the furnace accommodates a graphite tube 5 that is supported at each end, in such a way that it can turn, by two rollers 7a and 7b mounted on pedestals 6a and 6b. One end of graphite tube 5 is secured to a holder 8 that communicates with a motor 10 through a vacuum-tight rotating bearing 9. Graphite tube 5 is surrounded by a quartz-glass tube 11, on which is mounted a heating coil 12, that is in turn connected through an insulated connection 13 to a medium-frequency generator 14. Heating coil 12 has a coolant flowing through it in the direction indicated by arrows 27 and 28. Between graphite tube 5 and tube 11 is a heat-insulating layer 15 of graphite felt. A vacuum pump 17 is flanged to a connection 16. Another connection 18, which leads to a valve 19, supplies inert gas. As is evident, chamber 1 is on the whole double walled, and each section is supplied with connections 20 and 21 to supply and remove a coolant, which flows in the direction indicated by arrows 22.

How the method in accordance with the invention is carried out in the aforesaid furnace will now be described. A porous article 23 of glass soot, a hollow cylinder with a graphite rod extending through its channel in the present case, is inserted in graphite tube 5 and disks 25 and 26 of graphite felt are introduced into opposite ends of tube 5. Article 23 has an outside diameter of 200 mm, an inside diameter of 80 mm, and a length of 900 mm. Article 23 is slightly conical both inside and outside, with the difference between its shortest and its longest outside diameter being 10 mm and the difference between its shortest and its longest inside diameter being 5 mm. Once vacuum pump 17 and mediumfrequency generator 14 have been turned on and once the temperature has attained 1300° C., article 23 is sintered for 40 minutes at a a pressure of 1 mbars in inside 4. The temperature is then increased to 1500° C. and motor 10 is turned on and controlled in such a way that graphite tube 5 will turn at 2 revolutions per minute in the direction indicated by arrow 29. At this temperature article 23 is heat-treated for 30 minutes, rolling against the inside of the wall of graphite tube 5. Upon completion of the vitrification stage, the second stage is initiated by increasing the temperature to 1720° C. and controlling motor 10 in such a way that graphite tube 5 will turn at 25 revolutions per minute. The second vitrification stage takes 25 minutes. Vacuum pump 17 is then turned off and a pressure of 10 bars is maintained at a temperature of 1720° C. for 10 minutes. Medium-frequency generator 14 is then turned off and the vitrified article 23 is left to cool in furnace 1 with the rotation being continued until the temperature drops to 1200° C. The article 23 is removed from the furnace once the temperature has dropped to room temperature. It turns out that, once an article 23 so treated in accordance with the invention has been removed from the furnace, the inner and outer conicity it possessed prior to vitrification is altered only negligibly.

The present specification and claims are of course intended solely as illustrative of one or more potential embodiments of the invention and should not be construed as limiting the invention in any way. The invention may accordingly be adapted and modified in many ways that may occur to one of skill in the art without deviating from the theory behind it or exceeding the scope of its application.

What is claimed is:

1. In a method of vitrifying a porous cylindrical article made out of glass soot, especially for manufacturing a preliminary blank for optical fibers whereby the article is heat-treated in a furnace in a vacuum or in an atmosphere that contains helium, the improvement comprising placing the porous article in a horizontal graphite tube in the furnace, sintering the article therein for 20 to 40 minutes in a vacuum or in a helium atmosphere with reduced pressure at 1250° to 1400 ° C., and subsequently vitrifying the sintered article by heat-treating the sintered article in a first stage in the sintering atmosphere while slowly rotating the article in the graphite tube for 20 to 40 minutes at 1450° to 1600 ° C. and then, while rotating the article in the graphite tube more rapidly than in the first stage, and heating the article in a second stage for 10 to 30 minutes at 1650° to 1750 ° C.

2. A method as in claim 1, wherein the sintered article is rotated in the first stage with the graphite tube turning at 1 to 5 revolutions per minute.

3. A method as in claim 1, wherein the sintered article is rotated in the second stage with the graphite tube turning at 20 to 40 revolutions per minute.

4. A method as in claim 1, wherein a vacuum of $10^{-1}$ to 10 mbars or a helium atmosphere with a pressure of 50 to 200 mbars is maintained in the furnace during the sintering.

5. A method as in claim 1, wherein the article is a hollow cylinder that loosely accommodates a solid or hollow cylindrical graphite shape.

6. A method as in claim 1, wherein during or subsequent to the second stage of vitrification an inert-gas atmosphere is generated at higher than normal pressure.

7. A method as in claim 6, wherein an inert-gas pressure of 5 to 100 bars is maintained.

8. In a furnace for carrying out a method of vitrifying a porous cylindrical article made out of glass soot, the furnace including a horizontal, stationary first chamber having disposed therein a horizontal second chamber which is rotatable around its longitudinal axis, said second chamber connected to a motor via a longitudinal rotatable shaft that passes through a bearing, said furnace with a connection for evacuating the inside of the furnace and a connection for supplying inert gas to the inside of the furnace, the improvement comprising said horizontal second chamber in the furnace comprising a longitudinally rotatable graphite tube with the article being disposed inside the graphite tube during heat treatment, the second chamber being surrounded by and electrically insulated from a stationary heating coil, and the furnace comprising a stationary tube made out of fused quartz or quartz glass, said tube being disposed between the graphite tube and the heating coil.

9. A furnace as in claim 8, further comprising a heat-insulating layer of graphite felt disposed between the graphite tube and the tube made out of quartz or quartz glass.

10. A furnace as in claim 8, wherein the second chamber is double-walled and has connections for supplying and removing coolant.

11. A furnace as in claim 8, wherein the heating coil is an electric heating coil.

12. A furnace as in claim 8, further comprising a graphite felt disk disposed at each end of said second chamber.

* * * * *